United States Patent
Baker et al.

(10) Patent No.: US 10,490,086 B1
(45) Date of Patent: Nov. 26, 2019

(54) SYSTEM AND METHOD FOR COLLECTING AIRPORT GROUND POSITIONAL DATA AND TRANSMITTING NOTIFICATIONS FOR GROUND-BASED AIRCRAFT AND OTHER AIRPORT VEHICLES

(71) Applicant: FlightAware, LLC, Houston, TX (US)

(72) Inventors: Daniel Baker, Houston, TX (US); Karl Lehenbauer, Houston, TX (US); Caroline Rodewig, Houston, TX (US); James Sulak, Houston, TX (US); Mark L. Duell Jr., Houston, TX (US); Zachery Conn, Houston, TX (US); Jeffrey A. Lawson, Austin, TX (US)

(73) Assignee: FlightAware, LLC, Houston, TX (US)

( * ) Notice: Subject to any disclaimer, the term of this patent is extended or adjusted under 35 U.S.C. 154(b) by 0 days.

(21) Appl. No.: 16/159,195

(22) Filed: Oct. 12, 2018

(51) Int. Cl.
*G08G 5/00* (2006.01)

(52) U.S. Cl.
CPC ................... *G08G 5/0026* (2013.01)

(58) Field of Classification Search
CPC ...... G08G 5/0026; G08G 5/0008; G08G 5/04; G08G 5/001; G08G 5/065; G06F 3/16; G01S 13/876
See application file for complete search history.

(56) References Cited

U.S. PATENT DOCUMENTS

| | | |
|---|---|---|
| 6,606,563 B2 | 8/2003 | Corcoran, III |
| 6,873,903 B2 | 3/2005 | Baiada et al. |
| 7,158,053 B2 * | 1/2007 | Crank ................ B64D 45/0015 340/963 |
| 8,140,199 B2 | 3/2012 | Barry et al. |
| 8,378,852 B2 | 2/2013 | Naimer et al. |
| 8,554,457 B2 | 10/2013 | White et al. |
| 9,142,134 B2 | 9/2015 | White |
| 9,180,978 B2 | 11/2015 | White et al. |
| 10,410,530 B1 * | 9/2019 | Kant .................... G08G 5/065 |
| 2010/0017105 A1 * | 1/2010 | Pepitone ............ G08G 5/0008 701/120 |
| 2010/0017127 A1 * | 1/2010 | Pepitone ............ G08G 5/0008 701/301 |
| 2010/0185426 A1 | 7/2010 | Ganesan et al. |
| 2012/0072101 A1 * | 3/2012 | Mutuel ............... G08G 5/0008 701/300 |

(Continued)

*Primary Examiner* — Hoi C Lau
(74) *Attorney, Agent, or Firm* — Woodard, Emhardt, Henry, Reeves & Wagner, LLP; William McKenna; John McNett

(57) ABSTRACT

A computer-implemented system and method processes position information for aircraft located on the ground and provides a notification to a remote user in response to a triggering event. Typically, aircraft position data is received over a digital network. The service accepts requests for notification associated with an identified aircraft and subsequently provides notifications of events based upon the aircraft position data. Upon receiving a user query, a server subsequently retrieves a result set from the aircraft ground position data and determines if an event associated with the identified aircraft has occurred and if so, triggers the notification. In one form, the requested notification may be presented to the user in the form of an HTML message or update, e-mail, telephone call, text message or the some other electronic transmission or message.

18 Claims, 9 Drawing Sheets

(56) References Cited

U.S. PATENT DOCUMENTS

| | | |
|---|---|---|
| 2013/0041575 A1 | 2/2013 | Cole |
| 2015/0331099 A1* | 11/2015 | Wu .................... G01S 13/876 342/32 |
| 2016/0240090 A1 | 8/2016 | Marcella et al. |
| 2017/0337828 A1* | 11/2017 | Kathirvel ............ G08G 5/0008 |
| 2018/0012499 A1 | 1/2018 | Madhusudan et al. |
| 2018/0174588 A1* | 6/2018 | Agarwal .................. G06F 3/16 |
| 2018/0225651 A1* | 8/2018 | Stone ................. G06Q 20/085 |
| 2019/0266904 A1* | 8/2019 | Kant ...................... G08G 5/04 |

* cited by examiner

300 – START

302 – Server receives position report regarding an identified airport vehicle from ADS-B location 304 – OPTIONAL – Server receives a second position report for the same airport vehicle from a second location 306 – Server decodes and parses the received position report(s)

308 – OPTIONAL – Server fuses the position reports

310 – Server determines whether the position report is/are part of an existing ground track within the data store 312 – If so, server adds the positional information to update the existing ground track 314 – If not, a new ground track is created and populated with the positional information and the airport vehicle's identifying information 316 – Server determines whether the new/updated ground track is complete -If not, return to stage 302
-If so, proceed 318 – Completed ground track is compacted and archived for efficient storage.

320 - END

Fig. 3

400 – START

402 – Retrieve updated ground track for a given airport vehicle

404 – Retrieve list of previously occurring surface-based airport vehicle events for given ground track 406 – For each surface-based airport vehicle event, determine if future occurrences of that same event are allowed with the current ground track 408 – If so, apply predetermined event rules for the current surface-based airport vehicle event to the ground track 410 – If the predetermined event rules indicate a positive result, record the occurrence of the corresponding surface based airport vehicle event in the ground track along with an associated time and position 412 – Determine if all surface-based airport vehicle events have been tested If not, return to stage 408
If not, proceed

414 – END

Fig. 4

| \multicolumn{3}{c}{Predetermined Event Rules for Surface-Based Airport Vehicle Event "Begun Taxiing"} |||
|---|---|---|
| Rule # | Test | Result Required to Advance |
| 1 | Is the most recent surface-based aircraft event in the ground track "avionics on" or "parked"? | YES |
| 2 | Is the position of the aircraft moving? | YES |
| 3 | Is the displacement distance of the aircraft greater than the combined error radius of two position reports? | YES |
| 4 | Has the aircraft's position moved for five consecutive position reports? | YES |
| 5 | Have a "began taxiing" event issued for this ground track before? | NO, or YES w/ each prior "begun taxiing" followed by a more recent "parked" event. |
| 6 | Has a flight associated with the aircraft taken off from the current airport within last hour? | NO |

Fig. 5

| \<center\>Predetermined Event Rules for<br>Surface-Based Airport Vehicle Event "Avionics Off"\</center\> | | |
|---|---|---|
| *Rule #* | *Test* | *Result Required to Advance* |
| 1 | Was the last position reported for the aircraft a ground position (i.e. within 500 ft. of airport's elevation)? | YES |
| 3 | Is immediate prior ground speed < 40 knots? | YES |
| 4 | Is current ground speed < 5 knots? | YES |
| 5 | Has a "stopped taxiing" event been issued? | YES |
| 6 | Has a flight associated with the aircraft taken off from the current airport within last hour? | NO |
| 7 | Has 10 minutes passed without a ground position report being received for the associated aircraft? | YES |

Fig. 6

700 – START

702 – Surface-based airport vehicle event is detected for a certain airport vehicle 704 – Retrieve positional information where the surface-based airport vehicle event occurred 706 – Identity airport containing the location identified by the positional information 708 – Retrieve sub-airport location map for the identified airport 710 – Identify which sub-airport locations contain the location identified by the positional information 712 – In the event of more than one sub-airport location, perform conflict resolution 714 – Determine the sub-airport location at which the surface-based airport vehicle event occurred 716 – Store the determined sub-airport location in association with the surface-based airport vehicle event within the associated ground track of the identified airport vehicle

718 – END

Fig. 7

900 – START

902 – Service receives a request for notifications regarding an identified aircraft 904 – Optionally, service may present a list of aircraft to the user for selection of the identified aircraft 906 – Service receives information regarding the device where the requested notification should be sent 908 – Service receives selection of the type of notifications desired regarding the identified aircraft 910 – Service monitors all active ground tracks for the identified aircraft for the detection of a surface-based aircraft event 912 – Service determines that a surface-based aircraft event has occurred which is attributed to the identified flight 914 – Determine if the surface-based aircraft event which occurred is one for which the user has requested a notification 916 – If so, transmit a notification to the user at the specified device including details regarding the occurrence of the surface-based aircraft event, including its time of occurrence and location of occurrence.

918 – Return to stage 910, unless notification request is terminated

920 – END

Fig. 9

SYSTEM AND METHOD FOR COLLECTING AIRPORT GROUND POSITIONAL DATA AND TRANSMITTING NOTIFICATIONS FOR GROUND-BASED AIRCRAFT AND OTHER AIRPORT VEHICLES

FIELD OF THE INVENTION

The present invention generally relates to a system and method for collecting airport ground positional data from a number of remote data acquisition sites for subsequent processing and the transmission of ground based notifications based on the collected ground positional data to a user. More particularly, the present invention pertains to a ground-based airport vehicle tracking service, including ground-based aircraft, which collects positional data from a plurality of remote data acquisition sites, including a plurality of different types, and processes and filters the data to identify various ground-based events and subsequently transmit notifications of such events to specified users.

BACKGROUND OF THE INVENTION

In 1995, the United States Federal Aviation Administration (FAA) made a wealth of minute-by-minute radar-based flight tracking information available for distribution to the public with the creation of the Aircraft Situation Display to Industry (ASDI) service, which is now known as the TFM-Data available from the SWIM feed from the FAA. Through this service, flight tracking data is made available to several vendors from a single source. The TFMData includes the location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included.

In addition, other sources of flight tracking information have recently become available, including next-generation automatic dependent surveillance broadcast (ADS-B) information, which may be utilized independently or in combination with the TSMData data to provide the requested flight tracking information as well as information for other ground-based airport vehicles, such as fuel trucks, deicing trucks and the like. For aircraft, ADS-B provides real-time position information that is, in many cases, more accurate than the information available with traditional radar-based systems. ADS-B uses GPS signals along with aircraft avionics to transmit an aircraft's location from an on-board transceiver to permanent receivers located on the ground. The ground receivers then transmit that information to air traffic controllers, cockpit displays of other aircraft equipped with ADS-B avionics, and the like. An aircraft equipped with ADS-B also periodically broadcasts other relevant information such as the aircraft's identification, altitude, and velocity. Currently, this information is broadcast approximately every second.

The on-board portion of the ADS-B system relies on two avionics components: (1) a high-integrity GPS navigation source and (2) a datalink (ADS-B unit). There are several types of certified ADS-B data links, but the most common ones operate at 1090 MHz. ADS-B adoption has reached maturity as it is expected that most, if not all, commercial aircraft will be equipped with ADS-B equipment within the next year or so. In addition, a private corporation was awarded a contract in August of 2007 to build, install and maintain a nationwide network of ADS-B ground receivers. Typically, these ground receivers are located at, near, or are in direct communication with airports, as the system has an effective operating range of roughly 100 to 150 miles. Since approximately 2015, ground receivers sufficient to provide coverage for virtually the entire airspace over the continental U.S. have been in place.

The wealth of information collected by the ADS-B service, and other information collection systems like it, has led to the establishment of a number of online flight tracking services. Tracking flights via radar and ADS-B has provided great benefits, primarily that of keeping aircraft from colliding with each other. In addition, these advance tracking systems have aided and/or save many flights by enabling air traffic controllers to know where an aircraft is and to communicate with the pilot(s) in a variety of situations where historically those flights may have otherwise been lost.

These flight tracking services have led to numerous new commercial uses for flight tracking data, including allowing the general public to track flights, make decisions about when to head to the airport, providing data to aircraft operators, airlines, etc., for use in notifying the public and their employees about the status of flights, perform fuel burn analyses, make improved predictions of arrival times, automatically send notifications to people and software when flights depart, arrive, are diverted, incur delays, etc.

However, the information provided by these flight tracking services is limited in that it is heavily based upon flight tracking between take-off (i.e. wheels up) and landing (i.e. wheels down.). Even with all the value this has created, insight into the operation of aircraft while they are on the ground has been limited. Most people have had very little insight into what is happening during the time between when the aircraft is first powered up, pushes back from the gate or FBO, taxis to the departure runway, gets fueled or de-iced or transits customs, etc. Similarly, upon arrival, little insight is provided into ground operations conducted by the aircraft until it reaches its final parking place at the airport.

As a result, a significant portion of the aviation industry, including private aviation, continues to utilize tedious and time consuming traditional methods of ground-based aircraft tracking. For example, Fixed-base Operators (FBOs) routinely answer dozens of phone calls per hour from various flight coordinators within a flight department who seek information regarding the preparation of a plane for a flight, including removal of the plane from the hangar, arrival of a flight crew or passengers, or status of serving with a ground power unit (GPU). Upon passenger arrival, the flight crew is busy preparing the flight and does not need the additional burden of reporting their progress to the flight coordinators in their respective flight department. Consider that for very short flights an aircraft can spend more time taxiing than it spends in the air, while for short flights taxi times are a major portion of the total time of the flight, and even for long flights several percent of the total time is still occupied by the aircraft activity that occurs on the ground. Being able to track aircraft while they are on the ground and disseminate this information makes many new applications possible as well as allowing for more accurate estimated time of arrival calculations. Accordingly, there is a need for a system which to extends flight tracking from takeoff-to-landing to encompass all of the ground operations that occur prior to takeoff and after landing. Moreover, the system may be expanded to include other ground-based airport vehicles.

BRIEF DESCRIPTION OF THE DRAWINGS

FIG. 3 is a flowchart illustrating an exemplary process for collecting and reporting airport vehicle position information from a selected location, such as a location within Airport Vehicle Information Provider Network of FIGS. 1 and 2.

FIG. 4 is a flowchart illustrating an exemplary process for detecting the occurrence of one or more surface-based airport vehicle events from received airport vehicle position reports according to one embodiment of the present invention.

FIG. 5 is a plan view of an exemplary set of predetermined event rules, all of which must be met, in order for the surface-based airport vehicle event of "begun taxiing" to be identified.

FIG. 6 is a plan view of an exemplary set of predetermined event rules, all of which must be met, in order for the surface-based airport vehicle event of "avionics off" to be identified.

FIG. 7 is a flow chart illustrating the process for determining a sub-airport location where the surface-based airport vehicle event occurred according to one embodiment of the present invention.

FIG. 9 is a flowchart illustrating an exemplary process for requesting and transmitting notification regarding the occurrence of surface-based airport vehicle events for one or more identified airport vehicle according to one embodiment of the present invention.

DETAILED DESCRIPTION OF THE SPECIFIC EMBODIMENTS

Figure 1:
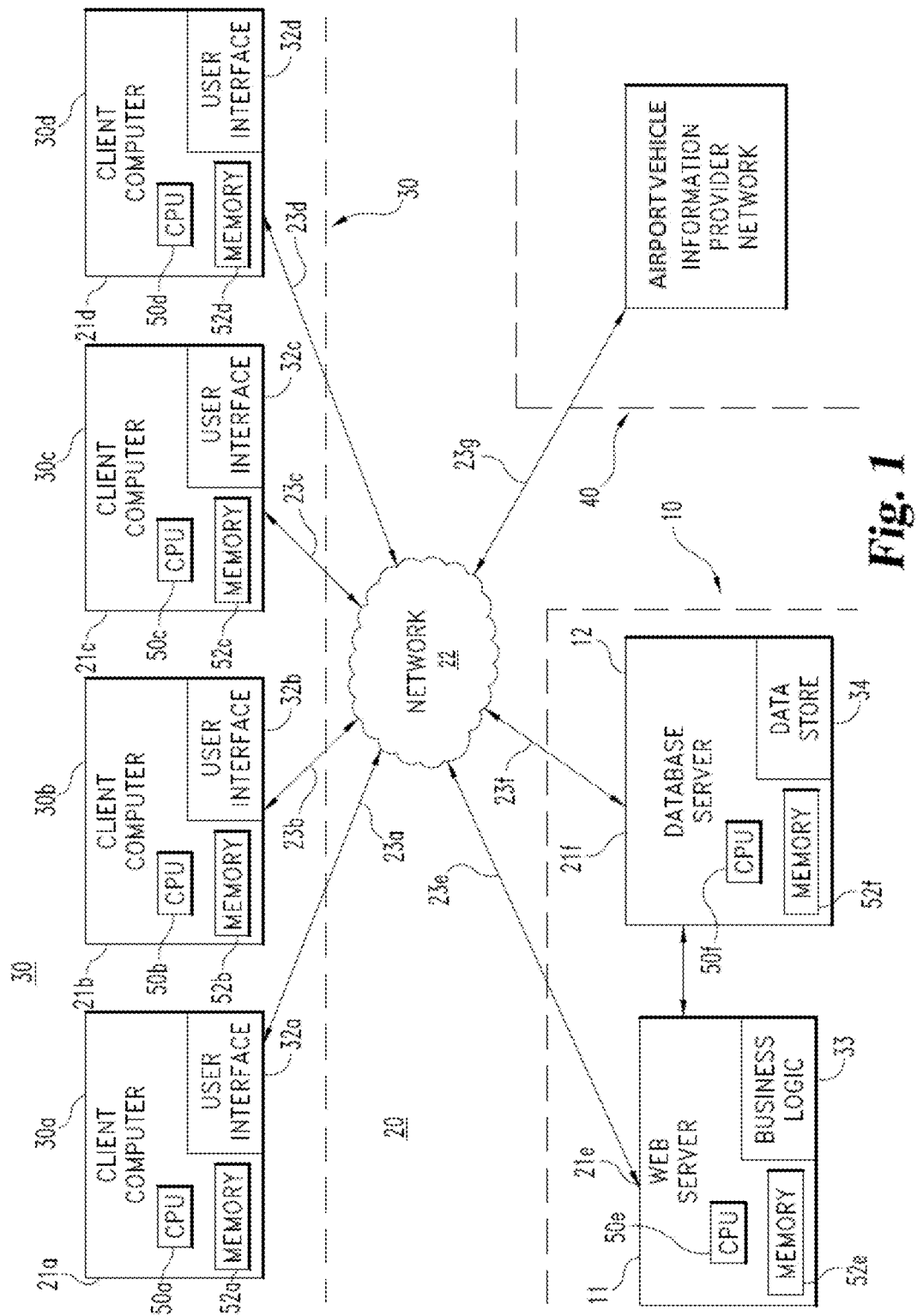
FIG. 1 is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. While examples are provided as to aircraft, these principles are equally applicable to airport vehicles as well. Any alterations and further modifications in the described embodiments, and any further applications of the principles of the invention as described herein are contemplated as would normally occur to one skilled in the art to which the invention relates.

In the course of a single day, nearly 100,000 flights are completed worldwide from destination to destination. Currently, sophisticated systems exist which provide highly-accurate flight tracking information for these flights from take-off to landing. These systems include both traditional radar systems and next generation on-board GPS-based communication systems, such as ADS-B which provides for a second-by-second positional update. However, these systems do not provide an optimized way for commercial, private and other personal aviation entities, and their associates to stay informed about the status of aircraft or flights prior to takeoff or after landing. The present invention utilizes aircraft position information for aircraft which are located on the ground to provide valuable notifications of the occurrence of various events which are determined from the periodic aircraft position information received. In addition, ADS-B information may be provided for other vehicles, but no other notifications are provided. For purposes of this invention, these other vehicles and ground-based aircraft shall be referred to as airport vehicles, and may include, by way on non-limiting example, fuel tankers, luggage trucks, aircraft tugs, deicing trucks, fire trucks, shuttles, helicopters, dollies, chocks, service stairs, buses and any other common airport ground support equipment.

In addition to ADS-B data, approximately forty large airports in the United States have Airport Surface Detection Equipment, Model X (ASDE-X), a surface movement radar that enables air traffic controllers to monitor taxiing aircraft and ground vehicles as they move around the airport's ramps, gates, taxiways, and runways, etc. The FAA makes this data available to the aviation industry in real-time. It updates once per second and can be read from dual-redundant data feeds, to provide enhanced reliability. The vast majority of airports do not have ASDE-X surface radar. However with the widespread mandating of ADS-B equipage for civilian aircraft fleets, ADS-B receivers located near the airports can provide aircraft and ground vehicle location, heading and speed information while they are on the ground. Where ASDE-X is available it is useful to fuse the ASDE-X data with received ADS-B data for several reasons. ASDE-X does not always cover the entire facility. There can be ASDE-X outages, as well as ADS-B outages. Other data regarding ground movement is available from the Airport Surface Surveillance Capability (ASSC).

FIG. 1 is a diagrammatic view of computer system 20 of one embodiment of the present invention. In the illustrative embodiment, computer system 20 includes airport vehicle information service 10, Airport Vehicle Information Provider Network 40, and client computers 30. Computer system 20 also includes computer network 22. Computer network 22 couples together a number of computers 21a-21f over network pathways 23a-23g, respectively. More specifically, system 20 includes several servers, namely Web Server 11 and Database Server 12 of airport vehicle information service 10. It shall be appreciated that many additional servers may be included within Airport Vehicle Information Provider Network 40, as will be described with respect to FIG. 2.

System 20 also includes client computers 30a, 30b, 30c, and 30d (collectively 30). While computers 21a-21f are each illustrated as being a server or client, it should be understood that any of computers 21a-21f may be arranged to include both a client and server. Furthermore, it should be understood that while seven computers 21a-21f are illustrated, more or fewer may be utilized in alternative embodiments. Preferably, service 10 includes a collection of Web servers 11 for receiving, processing, and responding to user queries.

Computers 21a-21f include one or more processors or CPUs (50a, 50b, 50c, 50d, 50e, and 50f, respectively) and one or more types of memory (52a, 52b, 52c, 52d, 52e, and 52f, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a solid state disk (SSD); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown to preserve clarity, one or more of computers 21a-21f may be coupled to a display and/or may include an integrated display. Computers 21a-21f may be of the same type, or a heterogeneous combination of different computing devices. Likewise, displays may be of the same type, or a heterogeneous combination of different visual devices. Although again not shown to preserve clarity, each computer 21a-21f may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible. It shall be appreciated that client computers 30a-30d, or any other computer 21 for that matter, may be of an alternate type, such as a mobile device utilizing the iOS, Android, or any other operating system. This specifically includes iPhones and iPads (manufactured by Apple, Inc., located at 1 Infinite Loop Cupertino, Calif. 95014), Kindles (manufactured by Amazon.com, Inc., located at 1200 12th Avenue South, Suite 1200, Seattle, Wash. 98144-2734), Android phones/tablets (manufactured by various manufacturers), and other similar devices.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21a-21f can be coupled together by computer network 22.

In one embodiment, system 20 operates at one or more physical locations. Web Server 11 is configured as a web server that hosts application business logic 33 for an airport vehicle information engine, Database Server 12 is configured as a database server for storing airport vehicle information, such as positional information for ground-based aircraft and other airport vehicles, provided by Airport Vehicle Information Provider Network 40, and at least one of client computers 30a-30d are configured for providing a user interface 32a-32d, respectively, for accessing the airport vehicle information service 10. Database Server 12 maintains aircraft position information for aircraft which are located on the ground as well as for other airport vehicles. In a further form, Database Server 12 maintains data store 34 as a memory-resident database to provide more advanced searching functionality and minimize response times. User interface 32a-32d of client computers 30a-30d can be an installable application such as one that communicates with Web Server 11, can be browser-based, and/or can be embedded software, to name a few non-limiting examples.

In one embodiment, software installed locally on client computers 30a-30d is used to communicate with Web Server 11. Alternatively, client computers 30 may be referred to herein as user devices 30. In another embodiment, Web Server 11 provides HTML pages, data from web services, and/or other Internet standard or company proprietary data formats to one or more client computers 30a-30d when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Database (data store) 34 on Database Server 12 stores aircraft position information, including position data for aircraft located on the ground, and may also store additional information such as departure/arrival notices, flight plans, historical flight information, and/or aircraft information to name a few representative examples.

Typical applications of system 20 would include more client computers like computers 30a-30d at more physical locations, but only four have been illustrated in FIG. 1 to preserve clarity. Furthermore, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by service 10, Database Server 12 includes a relational database, such as SQL, as in known to one of skill in the art.

Figure 2:
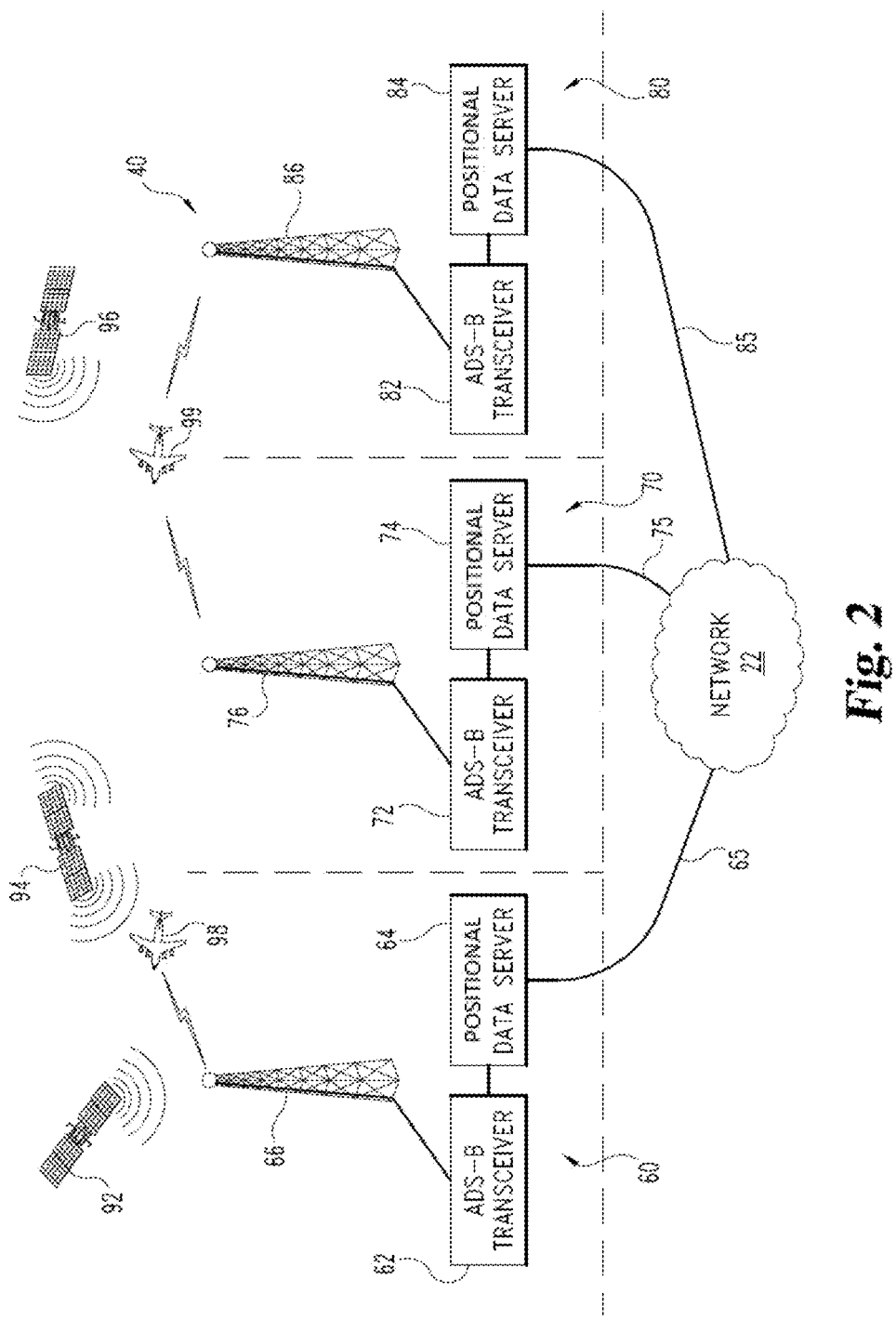
FIG. 2 is a detailed view of an exemplary Airport Vehicle Information Provider Network as shown in FIG. 1.

Turning to FIG. 2, one exemplary arrangement for a number of remotely located servers which comprise Airport Vehicle Information Provider Network 40 is shown. In the illustrative embodiment, three remote locations are shown, such as locations 60, 70, and 80. Each location illustrated includes an ADS-B transceiver (such as 62, 72, or 82), a positional data server (such as 64, 74, or 84) and an antenna (such as 66, 76, or 86). In each instance, the transceiver of that location is connected to both the positional data server and antenna of the same location via a series of connections and/or interfaces. Each location 60, 70 and 80 is connected to network 22 via a wired or wireless communication link, such as link 65, 75 and 85 respectively (collectively 23g). It shall be appreciated that, for purpose of the illustrated embodiment, these locations are each located so as to provide coverage for a portion of or the entirety of a given airport. In other forms, particularly where both ground and in-flight locations are desired, the locations may be located in a wide array, depending on the area(s) of coverage desired. In a broader embodiment, a very large number of locations would be included whose coverage area preferably spans a significant portion of the populated areas of the world. The locations 60, 70 and 80 do not need to be permanent nor do they need to be on the ground. Locations 60, 70 and/or 80 may be in located space (on satellites) as well as on moving vehicles such as ships or ground vehicles. In other forms, one or more of locations 60, 70 and/or 80 may be configured to provide an ASDE-X and/or ASSC feed alone or in addition to an ADS-B feed.

In the illustrated embodiment, the locations report altitude, latitude and longitude for each position report for ADS-B equipped aircraft and ground vehicles. In addition, data is provided to airport vehicle information service 10 from ADS-B messages that detail the accuracy of the GPS data. The accuracy can vary between something as inaccurate as greater than ten miles, although typically positions are much more accurate, less than 30 meters if a Wide Area Augmentation System (WAAS) is in use or even as accurate as two or three meters when a Local Area Augmentation System (LAAS) is in use. This accuracy information is utilized in determining when to operate based upon a position report and when to ignore it and wait for a more accurate report.

For purposes which will be described later, each positional data server 64, 74 or 84, or some other portion of the location 60, 70, and 80, is periodically updated to include a database of airports and airspaces of interest comprising the latitude and longitude of the airports and their elevations above sea level. In addition a GPS receiver at a known fixed location may be included within location 60, 70 and/or 80 in order to determine a real-time or periodic correction factor by comparing its detected position to its known position. This correction factor may be utilized by positional data server 64, 74 and/or 84 to adjust the positional information received by ADS-B receiver 62, 72, and/or 82 prior to transmission to airport vehicle information service 10.

Additionally shown are additional components which communicate with the Airport Vehicle Information Provider Network 40 to provide aircraft position information (including both ground and airborne) either directly or indirectly. Global positioning satellites 92, 94, and 96 operate in conjunction with the global positioning system (GPS) to provide signals for use in determining an accurate position of aircraft 98 and 99 or other airport vehicles (not shown) by their own on-board GPS receivers. This positional information, along with other optional information, is then transmitted by transceivers on-board ADS-B equipped aircraft, such as aircraft 98 and 99 or other airport vehicles, on a periodic basis. These transmissions are ultimately received by antennas located across the country, such as antenna 66, 76, and/or 86, depending upon whether or not they are in range. Once received by an antenna, the information is processed by the appropriate ADS-B transceiver and ultimately stored by the corresponding positional data server, which may include a database for storing the large amounts of data received due to its periodic nature.

Given that the information received from Airport Vehicle Information Provider Network 40 can be voluminous, certain system and methods, such as those described in U.S. Pat. No. 8,958,931 entitled "System and Method for Collecting Remotely Located Positional Data", the content of which is hereby incorporated by reference in its entirety, may be adapted and implemented by computer system 20 in order to reduce the data traffic required. For example, during movement of an airport vehicle, such as an aircraft located on the ground, a higher data rate may be provided. The presence of an aircraft on the ground may be determined by determining from its positional reports whether the aircraft is located at an elevation of below 18,325 feet, and if so, whether it is located within five miles of an airport, and if so, whether the planes' elevation is within a specified number of feet from that airport's known elevation. For other non-flying airport vehicles, their presence on the ground may be presumed. In the event this test confirms that the aircraft is on the ground (or proximate thereto), then the data conservation methods of U.S. Pat. No. 8,958,931 may be overridden and the aircraft's position reported once per second or at some other desirable rate. Because ground based airport vehicles can change course a considerable amount in only a few seconds, a high update frequency of one position for each airport vehicle per second is targeted.

In a further form, the teachings of U.S. Pat. No. 8,958,931 can be extended such that after a first number of ground position reports from an airport vehicle that was previously not reporting, (i.e. avionics off for an aircraft) if no sizable position change is detected, the frequency of reports can be reduced until such time as a positional change is detect, such as the aircraft starts taxiing or the airport vehicle being moving. This may be determined by requiring that the position of the aircraft move outside of a defined window of uncertainty, which may be created using the accuracy information provided within an ADS-B position report. In the same manner, after a first number of ground position reports from an aircraft that was previously moving, (i.e. taxiing) if no sizable position change is detected, the frequency of reports can be reduced until such time as a positional change is detect, such as the aircraft starts taxiing again.

Turning to FIG. 3, with continued reference to FIGS. 1 and 2, a flowchart illustrating the process of receiving and handling ground based airport vehicle position information is illustrated. It shall be appreciated that all or a portion of one or more of the steps may be performed by another component of system 20 as opposed to the one described herein without departing from the scope of the present invention. The process begins at start point 300 with the airport vehicle information service 10, such as by Web Server 11, receiving a position report regarding an identified airport vehicle (stage 302) from one of locations 60, 70 or 80. It shall be appreciated that these airport vehicle position reports are received rapidly and in great volume, however, the receipt of a single airport vehicle position report is described herein for purpose of simplicity of illustration. In another form, the airport vehicle position reports are received and processed by Database Server 12. In other forms, various other servers may process the data prior to entry into the data store 34. The airport vehicle position reports include airport vehicle identification, altitude, a latitude and longitude location and velocity. In another step of the process, which is optional, the airport vehicle information service 10 receives a second position report for the same airport vehicle (stage 304) from a secondary source, such as an ASDE-X server.

Upon arrival, the first and second airport vehicle position reports are parsed (stage 306) and the data is converted into a suitable format for insertion into Database Server 12. In one form, stage 304 may include the decoding of a message, the conversion of binary numbers to standard integers, the conversion of characters into words, and any other data conversion that may be required based upon the format of the received message and the format of the desired information for subsequent handling. In the event stage 304 occurs, the airport vehicle information service 10 examines both the first and second aircraft position reports and fuses them together using prior airport vehicle position reports for the associated airport vehicle and positional accuracy information, such as that provided by ADS-B (stage 308). Specifically, when an airport vehicle position report is received, it is checked to see if the timestamp is older than or the same as the time of the last airport vehicle position report received by the novel service. If so, the stale aircraft position report is discarded. If not, it is processed further. In some instances, it may be desired to enable an ADS-B position report to supersede or still be processed in light of a more recent position report from a secondary source, such as ASDE-X.

Once the contents of the message are obtained and the data fused, the novel service identifies the airport vehicle it is associated with whether or not the message relates to an existing ground track in the data store 34 (stage 310). A "ground track" is a set of positions reflecting the ground activity of a single airport vehicle over a range of time. In the case of a departing aircraft, a ground track begins when an airplane powers on and ends when the airplane becomes airborne. For arriving aircraft, a ground track begins when the airplane touches down and continues until the airplane powers off. Ground tracks may also cover the repositioning of an aircraft from one part of the airport to another, or simply the avionics powering on, remaining on for a while, and then powering off, without the aircraft moving. For other airport vehicles, a ground track may end after a predetermined period without any movement or activity or when power to the airport vehicle is turned off. If an existing and in-progress ground track is found for the airport vehicle to which the contents of the message relate, the contents of the message are coupled with the existing information about the airport vehicle and the ground track is updated (stage 312).

In the event that the message does not relate to an existing ground track, a new ground track record is established for the airport vehicle and populated with the contents of the message (stage 314). The ground track is assigned a unique identifier based on the time the first message is received, the transponder code received, and the airport that the airport vehicle is located at. In one form, in the case of aircraft, an attempt is made to look up the aircraft's registration number based on the transponder code, such as from filed flight plans, if successful, the registration is used in preference to the 24-bit transponder code (hexid). For the case of ADS-B the aircraft crew can set a flight identifier such as an airline code and number ("UAL123"). If this is present then it is used in constructing the unique ID in preference to the registration or the hexid. Alternatively, this flight number can be pulled from an associated flight plan and correlated. Each ground track is begun with a "track start" message that identifies the airport, the ground track identifier, the aircraft or ground vehicle's latitude and longitude and the date and time of the first message received.

After a position record is updated in stage 312 or created in stage 314, the novel service periodically determines if the airport vehicle's ground track is complete (stage 316). For aircraft which depart the airport via flight, the end of a ground track is relatively easy. The novel service receives aircraft position updates which show that the aircraft has accelerated down a runway and taken off. This may include the receipt of positional information from the TSMData. For arriving aircraft of aircraft being repositioned, the novel services waits for a set amount of time to pass with no messages being received from the aircraft at all (such as ten minutes), before ending a given ground track. For other airport vehicles, a lack of movement over a predetermined period without any movement or activity or when power to the airport vehicle is turned off. All tracks begin with a "track start" and end with a "track end". In either event, when a ground track is determined to be complete the novel service may archive the ground track by compacting the record to minimize storage requirements going forward (stage 318) and awaits receipt of another airport vehicle position report. It shall be appreciated, that any number of airport vehicle position reports may be processed in parallel by the novel service and that FIG. 3 is simply illustrative of the sequential path of processing for a single airport vehicle position report or a pair of contemporaneous airport vehicle position reports. The process of FIG. 3 ends at end point 320.

Turning now to FIG. 4, with continued reference to FIG. 1-3, a flow chart illustrating the process for detecting the occurrence of one or more surface-based airport vehicle events from received airport vehicle position reports according to one embodiment of the present invention is illustrated. As utilized herein, the term "surface-based airport vehicle event" is defined as a change in status of an airport vehicle located on the ground. A "surface-based airport vehicle event" does not include a mere change in position from one point to another or the mere display and/or report of airport vehicle description and position information. Non-limiting examples of surface-based airport vehicle events include: avionics turned on, vehicle turned on, begun taxiing, begun moving, turned onto a taxiway, turned off of a taxiway, turned onto a runway, turned onto an active runway, turned off of a runway, turned off of an active runway, entered deicing pad, stop taxiing (parked), avionics turned off and vehicle turned off. In further forms, one or more of these events may include or have a complementary event which is triggered by crossing a threshold that is near the location, such as entering a threshold which is adjacent to an active runway.

The process begins at starting point 400 with the processor 50*e* and or 50*f* of airport vehicle information service 10 retrieving a ground track associated with a given airport vehicle from data store 34 (stage 402). In one form, the process of detecting one or more surface-based airport vehicle events may occur periodically or continuously, however, for purposes of illustration, this embodiment will be described as occurring after each positional update for a given ground track. The process next retrieves a list of all available surface-based airport vehicle events (stage 404). For a given ground track, business logic 33 dictates that certain surface-based airport vehicle events may only occur once or may not occur under the current conditions. For example, no more than a single "avionics turned on" event may occur in a given ground track for an aircraft, and no more than a single "vehicle turned on" event may occurred in a given ground track for a non-aircraft airport vehicle. Moreover, a second "begun taxiing" event may not occur without the occurrence of a "stop taxiing" event for an aircraft. Using the list of available surface-based airport vehicle events, the processor 50*e* and business logic 33 determines which, if any, of the surface-based airport vehicle events have previously occurred in the selected ground track (stage 406).

For each surface-based airport vehicle event for which a future occurrence would be allowed in the current ground track, the process programmatically applies the corresponding set of predetermined event rules for that potential surface based airport vehicle event (stage 408). In the event the predetermined event rules for a given surface based airport vehicle event are met, then the processor 50*e* stores the time of occurrence of the surface based airport vehicle event in association with the ground track in data store 34 (stage 410). The process checks to ensure that all available surface based airport vehicle events have had their predetermined rules compared against the ground track (stage 412) and if not, continues the process of stages 408, 410 and 412. In the event all available surface based airport vehicle events have had their predetermined rules compared against the ground track, then the process end at end point 414.

Provided below in FIGS. 5 and 6 are exemplary set of predetermined event rules, all of which must be met, in order for the surface-based airport vehicle events of "begin taxiing" and "parked" to be identified. Each test must result in the required result in order to proceed, and each test listed much pass in order to enable the associated surface-based airport vehicle event to be detected within the ground track. If one test fails, then the remained need not be queried for a given positional update.

In further forms, the invention includes algorithms to examine an aircraft surface track that is in progress and compare it to a database of filed flight plans. For departing flights, if a corresponding flight plan can be located that has a departure time in the near future, the algorithm makes a tentative determination that the aircraft is taxiing for the purpose of conducting that flight. If the flight then departs, this tentative determination is made certain. For arriving flights, the problem is easier. An aircraft that begins taxiing after arrival has a unique ground track identifier as previously mentioned, but the flight identifier is known from when the aircraft has just landed. The service may associate the ground track to the flight by storing the ground track in the arriving ground track database column of the flight data store 34.

As other examples, upon the first receipt of a message from an aircraft on the ground where the airport that the aircraft is located at can be determined from the latitude and longitude of the position report, an "avionics on" event is generated. When an aircraft has not moved more than the calculated distance for a set period of time (currently 30 seconds), a "taxi stop" event is generated.

Turning now to FIG. 7, with continued reference to FIGS. 1-6, a flow chart illustrating the process for determining a sub-airport location where the surface-based airport vehicle event occurred according to one embodiment of the present invention is illustrated. As utilized herein, the term "sub-airport location" shall mean a location that is more specific than an airport, such as for example, a specific ramp adjacent an identified fixed-base operator (FBO), an identified hangar, an identified runway (such as "runway 18"), an identified taxiway (such as "taxiway LH" or "west taxiway parallel to runway 12"), an identified apron, an identified gate, the runways collectively, the taxiways collectively or an identified deicing pad. A sub-airport location would not include all of Orlando International Airport (MCO) or the like.

Figure 8:
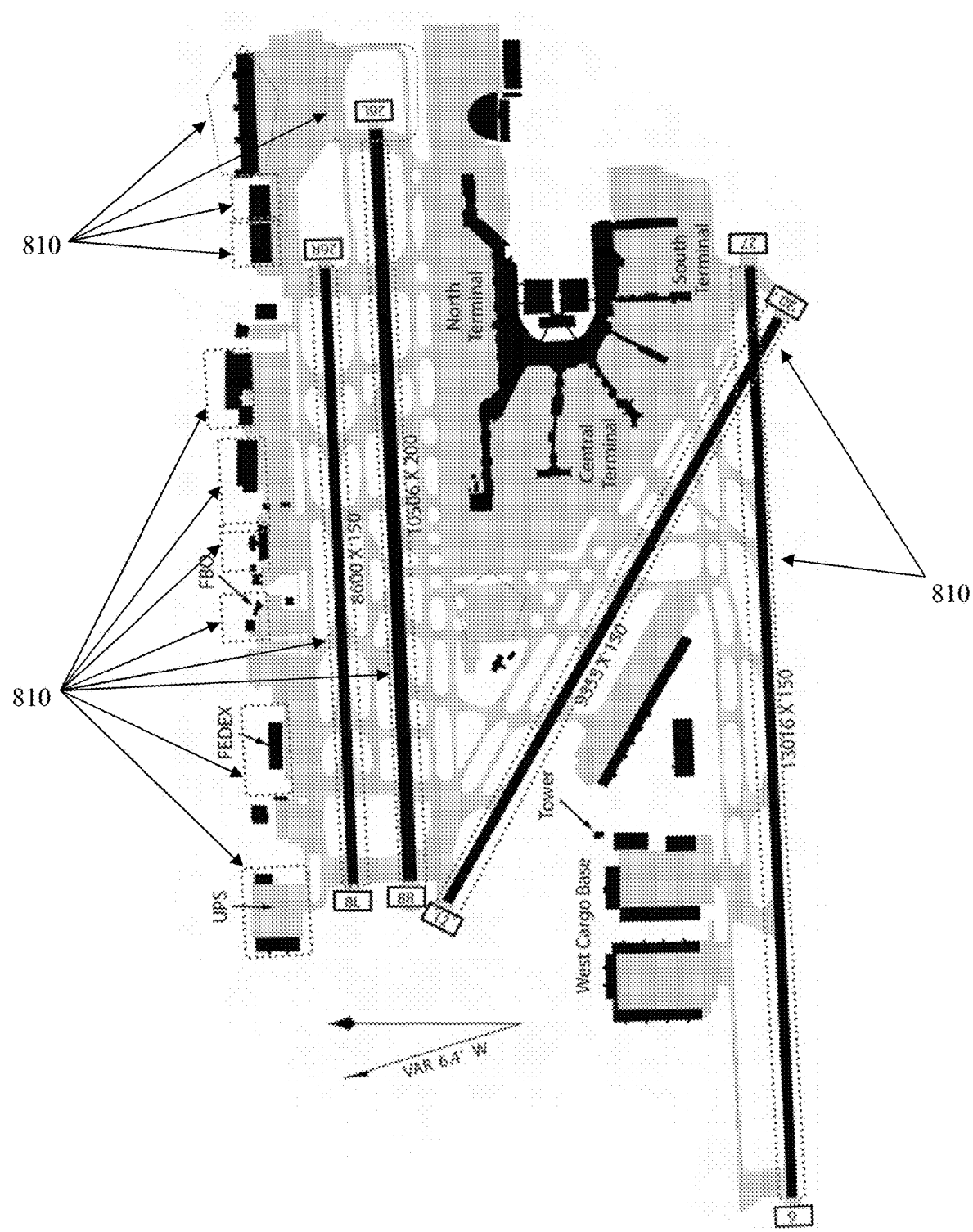
FIG. 8 is a logical view of an example airport showing the assignment of polygons or specific areas to various sub-airport locations for use in the process of FIG. 7 according to one embodiment of the present invention.

The process begins at stage 702 with the service determining that a surface-based airport vehicle event by a certain aircraft has occurred. The process proceeds to retrieve an event position from the current ground track associated with the airport vehicle which indicates where the surface-based airport vehicle event occurred (i.e. a GPS location) (stage 704). The process utilizes a lookup table or the like to determine which airport the identified position resides in (stage 706). The process then retrieves, such as from data store 34, a lookup table or other resource which logically maps GPS coordinates to one or more of a plurality of sub-airport locations existing within the identified airport (stage 710). A logical representation of such a map is provided in FIG. 8. As is shown in FIG. 8, such polygons, or otherwise defined areas, separately can include as examples the various runways and taxiways, aircraft ramps at Fixed Base Operators (FBOs), U S Customs, the deicing pad, hangars, gates, etc. When a position is on a runway, the runway is identified ("18", "36", etc.). When it is on a taxiway, the taxiway is identified ("A", "B", etc.). When it is at a location, the location is identified ("Signature Flight Support", "U S Customs", etc.)

In some instances, two or more polygons may overlap to each include the same GPS locations. In such case, the process performs a conflict resolution process (stage 712). In one form, this conflict resolution process simply selects the polygon having the smallest area to be the sub-airport location of occurrence for the given event. Using the polygon selected, the process identifies the associated sub-airport location to be the location of occurrence of the given ground-based airport vehicle event (stage 714). The process then stores the determined sub-airport location in association with the ground-based airport vehicle event within the ground track which it occurred. The process ends at end point 718. While polygons are preferred, other shapes can also be used.

Shown in FIG. 8 is a sample airport map 800 which shows the overlap of several sub-airport locations onto the map. In this example, the airport map 800 is of Miami International Airport. Included are runways 8L, 8R, 9, 12, 26L, 26R, 27 and 30. Each runway is bounded by a polygon 810 which encloses all of the GPS coordinates therein. In addition, other sub-airport locations such as FedEx, UPS, FBO, Taxiways A, B and C, and others are similarly bounded by polygons 810. In one form, some polygons 810 overlap so as to provide accuracy when aircraft or other airport vehicles destined for one area park proximate to another, which is common with some FBOs. While not always stored in visual form, FIG. 8 logically shows the polygon information which is utilized by the process of FIG. 7 to determine the sub-airport location where a surface-based airport vehicle event occurred.

FIG. 9, with continued reference to FIGS. 1-8, illustrates a flow chart laying out the process for providing notification of the occurrence of a surface-based airport vehicle event, which may include a sub-airport location where the event occurred, according to one embodiment of the present invention. The process begins at start point 900 with Web Server 11 of the novel service receiving a request from a remote user for one or more notifications regarding an identified airport vehicle (stage 902). In the illustrated embodiment, when dealing with aircraft, the request is received in a predetermined structured format and includes information identifying an aircraft that the user is interested in. For purposes of non-limiting example, this information may include a flight number, tail number, origin, destination, and/or a scheduled departure date/time. For other airport vehicles, unique identifiers or other look-up mechanisms may be provided for these purposes. In the event the information does not identify a unique airport vehicle, Web Server 11 may prompt the remote user with several options allowing them to search for and identify the specific airport vehicle of interest (stage 904). Preferably, the request is entered by the remote user into client computer 30a-d or a comparable user device and is communicated over network 22. It shall be appreciated that notifications for more than one airport vehicle, such as all notifications for a group of aircraft, such as a fleet of aircraft operated by an aviation company, or for all airport vehicle at a given airport or all aircraft at a given airport may be requested.

Along with the request received in stage 902, the novel service also preferably receives information identifying a device to which the requested notification should be sent (stage 906). This information may be in the form of a telephone number, email address, or the like and preferably also may include a notice type (i.e. text message, phone call, etc.) where appropriate. In an alternate form, the device identifying information may not be received, but rather may be predetermined based on a prior selection made in association with the user or general user settings, as would be appreciate to one of skill in the art.

Additionally, the novel service preferably receives information specifying the type of notification requested (stage 908). For example, one or more of the surface-based airport vehicle events may be selected by the user for notification upon their occurrence by the identified airport vehicle.

Once the specifics of the notification request have been received, business logic 33 of Web Server 11 begins monitoring any and all ground tracks associated with the identified airport vehicle that are stored within data store 34 (stage 910). At some time later, the novel service will determine that a surface-based airport vehicle event has occurred which is attributed to the identified airport vehicle (stage 912). Once detected, the service determines whether the surface-based airport vehicle event is one for which the user requested notification (stage 914). If not, the process ends and returns to stage 910. If so, then the process proceeds to transmit a notification to the user at the device specified in stage 906 (stage 916). In one form, the notification triggered may be an SMS message, an email, an electronic notification or some other formatted electronic notification. In another form, the notification includes the identity of the identified airport vehicle, the time and date of the occurrence of the surface-based airport vehicle event, and the location where the event occurred. In a further form, the location is provided as a sub-airport location. In one form, the notification provided may also include the airport vehicles identification, such as when dealing with aircraft, a tail number, flight identifier, or flight number, one or more of which may be obtained for a correlated flight plan.

Following transmission of the notification in stage 916, the process returns to stage 910 to continue to monitor for future notifications, unless the notification request of stage 902 is terminated or otherwise expires (stage 918). In the event of a termination or expiration, the process ends at end point 920.

The term "surface-based aircraft event" is a subset of a surface based airport vehicle event and is defined as a change in status of an aircraft, and not any other airport vehicle, located on the ground. A "surface-based aircraft event" does not include a mere change in position from one point to another or the mere display and/or report of aircraft description and position information. Non-limiting examples of surface-based aircraft events include: avionics turned on, begun taxiing, turned onto a taxiway, turned off of a taxiway, turned onto a runway, turned onto an active runway, turned off of a runway, turned off of an active runway, entered deicing pad, stop taxiing (parked) and avionics turned off. In further forms, one or more of these events may include or have a complementary event which is triggered by crossing a threshold that is near the location, such as entering a threshold which is adjacent to an active runway.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

What is claimed is:

1. A method for providing airport event notifications to remote users based upon ground position information for an airport vehicle generated by and relayed from at least one automatic dependent surveillance broadcast (ADS-B) ground station comprising the steps of:
   receiving, over the Internet from a remote user, a request for at least one notification regarding the activity of an identified airport vehicle;
   receiving from at least one ADS-B reporting station, a first data feed of near real-time ADS-B information comprising periodic time-stamped positional information reports regarding a plurality of airport vehicles on the ground;
   identifying, using at least one processor within a set of one or more processors, a first dataset which is subset of said first data feed consisting of the ADS-B information associated with the identified airport vehicle;
   determining, using at least one processor within the set of one or more processors, the occurrence of at least one surface-based airport vehicle event by the identified airport vehicle by programmatically applying a set of predetermined event rules to the first dataset; and
   sending over the Internet to said remote user, an electronic notification including information identifying the identified airport vehicle and the at least one surface-based airport vehicle event.

2. The method of claim 1, wherein said surface-based airport vehicle event is selected from the group consisting of avionics turned on, begun taxiing, stopped taxing and avionics off.

3. The method of claim 2, wherein said surface-based airport vehicle event is selected from the group consisting of begun taxiing and stopped taxing.

4. The method of claim 3, wherein the set of predetermined event rules require more than one positional information report point in order to identify at least one surface-based airport vehicle event.

5. The method of claim 4, wherein the set of predetermined event rules require a series of consecutive positional information reports in order to identify at least one surface-based airport vehicle event.

6. The method of claim 1, wherein said request for at least one notification regarding the activity of an identified airport vehicle includes an aircraft tail number.

7. The method of claim 1, wherein said request for at least one notification regarding the activity of an identified airport vehicle includes a flight identifier.

8. The method of claim 1, wherein said first data feed does not contain a complete set of all of the ADS-B information received by said ADS-B reporting station.

9. The method of claim 1, wherein said first data feed includes data generated by the Surface Movement Guidance and Control System.

10. The method of claim 1, further comprising the step of:
    receiving a second data feed including data generated by the Surface Movement Guidance and Control System; and
    adding portions of the second data feed which are associated with the identified airport vehicle to the first dataset.

11. The method of claim 1, where said electronic notification includes the tail number of the identified airport vehicle.

12. The method of claim 1, where said electronic notification includes the time of occurrence of the identified surface-based airport vehicle event.

13. The method of claim 1, wherein said electronic notification includes current positional information for the identified airport vehicle.

14. The method of claim 10, wherein said current positional information is presented in the form of an airport identifier.

15. The method of claim 10, wherein said electronic notification includes a sub-airport location for the identified airport vehicle.

16. The method of claim 1, wherein said receiving from at least one ADS-B reporting station occurs over the Internet.

17. A method for providing event notifications to remote users based upon ground position information for an aircraft generated by and relayed from at least one automatic dependent surveillance broadcast (ADS-B) ground station and a second data source comprising the steps of:

receiving, over the Internet from a remote user, a request for at least one notification regarding the activity of an identified aircraft;

receiving, over the Internet from at least one ADS-B reporting station, a first data feed of near real-time ADS-B information comprising periodic time-stamped positional information reports regarding a plurality of aircraft on the ground;

receiving, over the Internet from a second data source, a second data feed of near real-time positional information comprising periodic time-stamped positional information reports regarding the plurality of aircraft on the ground;

identifying, using at least one processor within a set of one or more processors, a first dataset which is a first data feed consisting of the ADS-B information associated with the identified aircraft;

identifying, using at least one processor within a set of one or more processors, a second dataset which is a subset of the second data feed consisting of the positional information associated with the identified aircraft;

combining, using at least one processor within a set of one or more processors, the first dataset and the second dataset of generate a combined dataset; wherein said combining includes removing at least one positional information report deemed to be inaccurate;

determining, using at least one processor within the set of one or more processors, the occurrence of at least one surface-based aircraft event by the identified aircraft by programmatically applying a set of predetermined event rules to the combined dataset; and sending over the Internet to said remote user, an electronic notification including information identifying the identified aircraft and the at least one surface-based aircraft event.

18. A system including a central server for providing event notifications to remote users based upon ground position information for an aircraft generated by and relayed from at least one automatic dependent surveillance broadcast (ADS-B) ground station comprising:

a plurality of remotely distributed ADS-B reporting stations, each ADS-B reporting station located at a different airport and operable to transmit a data feed of near real-time ADS-B information comprising periodic time-stamped positional information reports regarding a plurality of aircraft on the ground to the central server;

a database connected to the central server for storing ground position information for the plurality of aircraft; and at least one processor within a set of one or more processors for receiving over the Internet from a computer operated by a remote user, a request for at least one notification regarding the activity of an identified aircraft, identifying a first dataset which is subset of said first data feed consisting of the ADS-B information associated with the identified aircraft, determining the occurrence of at least one surface-based aircraft event by the identified aircraft by programmatically applying a set of predetermined event rules to the first dataset; and sending over the Internet to said remote user, an electronic notification including information identifying the identified aircraft and the at least one surface-based aircraft event.

* * * * *